US007246449B2

(12) United States Patent
Pierson et al.

(10) Patent No.: US 7,246,449 B2
(45) Date of Patent: Jul. 24, 2007

(54) INSTALLATION TEMPLATE FOR LOCK AND ALARM ASSEMBLIES

(75) Inventors: Josh Pierson, Golden, CO (US); Gilbert Lombardo, San Marcos, TX (US); Greg Drake, New Braunfels, TX (US)

(73) Assignee: Detex Corporation, New Braunfels, TX (US)

( * ) Notice: Subject to any disclaimer, the term of this patent is extended or adjusted under 35 U.S.C. 154(b) by 18 days.

(21) Appl. No.: 11/104,034

(22) Filed: Apr. 12, 2005

(65) Prior Publication Data

US 2005/0257389 A1 Nov. 24, 2005

Related U.S. Application Data

(60) Provisional application No. 60/563,030, filed on Apr. 17, 2004.

(51) Int. Cl.
*G01B 5/25* (2006.01)

(52) U.S. Cl. ............................ 33/613; 33/194; 33/562

(58) Field of Classification Search .................. 33/194, 33/562, 613, 645; 340/540, 545.1, 545.8, 340/547
See application file for complete search history.

(56) References Cited

U.S. PATENT DOCUMENTS 298,600 A * 5/1884 Mattice ...................... 33/562
1,629,172 A 5/1927 Murphy
1,838,333 A 12/1931 Stone
3,026,385 A 3/1962 Davis et al.
3,089,329 A 5/1963 Kerr
3,382,688 A 5/1968 Wellekens
3,503,233 A 3/1970 Russell et al.
3,724,244 A 4/1973 Schaumberg
3,738,013 A * 6/1973 Gregory ...................... 33/197
3,899,907 A 8/1975 Prahl
4,077,240 A 3/1978 Crasnianski
4,196,605 A 4/1980 Garza
4,297,862 A 11/1981 Solovieff
4,306,823 A 12/1981 Nashlund
4,331,411 A 5/1982 Kessinger et al.
4,359,886 A 11/1982 Evans et al.
4,390,172 A * 6/1983 Gotman ...................... 269/56
4,445,277 A 5/1984 Keefe
4,522,048 A 6/1985 Davis
4,553,336 A 11/1985 Ponce
4,573,334 A 3/1986 Crepinsek
4,581,909 A 4/1986 Weber
4,640,019 A * 2/1987 Paley .......................... 33/197
4,679,418 A 7/1987 Allen (Continued)

*Primary Examiner*—G. Bradley Bennett
(74) *Attorney, Agent, or Firm*—John G. Fischer; Mark D. Perdue; Storm LLP

(57) ABSTRACT

A template comprises a central member that has a recess adapted to receive and position the first portion of an alarm relative to the template. The central member has a first end and a second end. A longitudinal member extends perpendicular to, and coplanar with, the first end of the central member. The longitudinal member has at least one indicia for marking the installation location of the second portion of the alarm assembly on a second door. A flange extends from the second end of the central member in a plane perpendicular to that of the central member. The flange includes at least one indicia for marking the installation location of the second portion of the alarm member on a doorframe.

15 Claims, 4 Drawing Sheets

U.S. PATENT DOCUMENTS

| | | | | | |
|---|---|---|---|---|---|
| 4,715,125 | A | | 12/1987 | Livick | |
| 4,759,204 | A | | 7/1988 | Neyret | |
| 4,763,937 | A | | 8/1988 | Sittnick, Jr. et al. | |
| 4,813,826 | A | | 3/1989 | Riedel | |
| 4,930,822 | A | | 6/1990 | Shen | |
| 5,042,851 | A | | 8/1991 | Hunt | |
| 5,222,845 | A | | 6/1993 | Goldstein et al. | |
| 5,265,453 | A | | 11/1993 | Konil et al. | |
| 5,301,437 | A | * | 4/1994 | Burke | 33/562 |
| 5,335,520 | A | | 8/1994 | Lee | |
| 5,491,905 | A | * | 2/1996 | Jablonski et al. | 33/613 |
| 5,569,001 | A | * | 10/1996 | Brutscher et al. | 33/644 |
| 5,628,119 | A | * | 5/1997 | Bingham et al. | 33/613 |
| 5,901,992 | A | | 5/1999 | Winkler | |
| 5,940,979 | A | | 8/1999 | Ericksen et al. | |
| 5,988,708 | A | | 11/1999 | Frolov et al. | |
| 6,104,594 | A | | 8/2000 | Frolov et al. | |
| 6,430,834 | B2 | * | 8/2002 | Myers et al. | 33/194 |
| 6,502,436 | B2 | | 1/2003 | Beatty | |
| 2002/0026817 | A1 | | 3/2002 | Greer | |
| 2002/0170189 | A1 | * | 11/2002 | Cheatham | 33/194 |
| 2005/0210690 | A1 | * | 9/2005 | Morton | 33/194 |
| 2006/0010703 | A1 | * | 1/2006 | Gauthier | 33/613 |

* cited by examiner

INSTALLATION TEMPLATE FOR LOCK AND ALARM ASSEMBLIES

CLAIM OF PRIORITY

This application claims priority to U.S. Provisional Patent Application No. 60/563,030 filed on behalf of Josh Pierson, Greg Drake, and Gilbert Lombardo, entitled "Installation Template for Lock and Alarm Assemblies," filed on Apr. 17, 2004, and which is hereby incorporated by reference for all purposes.

FIELD OF THE INVENTION

The present invention relates generally to templates for installation of door hardware. More particularly, the present invention relates to templates for the installation of lock or alarm assemblies that have one portion associated with one part of a door assembly and another portion associated with another part of the door assembly.

BACKGROUND OF THE INVENTION

Templates are known to facilitate the fabrication and assembly of all variety of structures. In alarm and lock assemblies, the dimensional or positional relationships of portions of the assembly relative to one another and to the structure to which they are mounted or secured can be critical. Error in positioning can cause lock malfunction or failure. In the case of door alarms, where typically a sensor is used to detect the proximity of a magnet (mounted either on the doorframe or another door), the alignment between the magnet and the sensor, and particularly the distance between the sensor and the magnet, can be critical to proper alarm operation. Thus, precision in the installation of the assembly is quite important to successful operation of the alarm.

U.S. Pat. No. 6,430,834 B2 issued to Myers et al. ("Myers") discloses an installation template for installing a door closer. It is formed from three sheets: an under sheet coated with a release agent on both sides, and two installation templates, a pull side template and a push side template, both coated with a self-stick adhesive, attached to the under sheet. The installer determines whether the door closer needs to be mounted on the side the door is pulled towards, or on the side the door is pushed away from. In a pull side installation, the door closer is mounted on the door and the rod and shoe bracket are mounted on the doorframe. In a push side installation, the door closer is mounted on the doorframe and the rod and shoe bracket are mounted on the door. Once the type of installation is determined, the installer selects the appropriate side of the template, the pull side template or the push side template. The Myers patent calls for a paper template with two sets of written instructions upside down relative to each other, so as to allow one template to be used for both right hand doors and left hand doors.

U.S. Pat. No. 4,715,125 issued to Livick ("Livick") discloses a drilling template for accurately positioning latch holes and lock cutouts in door stiles. The template consists of a U-shaped frame having an inside width that accommodates doors of standard thickness, and having two side plates and one end plate. The end plate contains a latch hole, and includes a pair of adjustable and replaceable points above and below the hole template to temporarily engage the wood of the door stile, and to secure the frame, in order to identify the proper location of latch plate screws subsequently to be installed to secure the lock in the door. The latch hole template, centered at the end of the frame, provides a guide for boring a latch hole through the edge of the stile. A larger hole saw template, providing guides for larger diameter holes, is positioned along the sides of the frame for cutting the lock openings at various backsets from the stile edge.

U.S. Pat. No. 5,940,979 issued to Ericksen et al. ("Ericksen") discloses a marking template for locating holes for installing of door and drawer hardware. The template allows marking of locations for drilling holes both from the perspective of a side edge of a door or drawer, as well as from the perspective of a corner. It includes a flat body having a bottom edge connected to a triangular edge portion, and two slots perpendicular to the bottom edge. The flat bottom edge allows placing of the template along one of the side or top edges of a door or drawer, while the triangular edge portion is designed to receive the corner of a door or drawer. The slots hold a fitting that slides between two extreme positions and that has a plurality of spaced holes.

U.S. Pat. No. 4,445,277 issued to Keefe ("Keefe") discloses a universal programmable lock installation device for use on doors. This device consists of a body that extends around the edge of the door, defining an aperture adjacent the door edge, and extends inwardly along each door face. The aperture is adapted to receive a plate to guide boring in through the edge and to receive a plate to guide routing out the edge of the door, forming a hole that provides a recess to receive the face of the locking mechanism. It also includes calibrations or gradations to measure the correct spacing for the installation of specific locks.

U.S. Pat. No. 5,569,001 issued to Brutscher et al. ("Brutscher") discloses a template for use as a guide in installing door locks. It consists of a side bracket slidably received by a front bracket, with the two brackets aligned for a specific door width or thickness to form a guide to drill two perpendicular holes into the door.

U.S. Pat. No. 5,222,845 issued to Goldstein et al. ("Goldstein") discloses an adjustable drill guide apparatus to enable accurate drilling of holes in a door for the installation of a door handle assembly or lock. This apparatus has a U-shaped drill guide portion that fits around the edge of a conventional door with specific thickness, and has several side plates with a plurality of drill guide apertures arranged in locations to guide the drilling of holes.

U.S. Pat. No. 4,813,826 issued to Riedel ("Riedel") discloses a jig having replaceable templates for use with routers or similar tools for accurately forming the openings in the edge and faces of a door for the installation of finish hardware like mortise locks.

U.S. Pat. No. 4,553,336 issued to Ponce ("Ponce") discloses a latch face template fixture for a portable router. This fixture is designed to hold a portion of the door and provide a template to guide a portable router in cutting an opening for a latch face in the side of the door. The template consists of a rectangular base having a top surface and a bottom surface. It also has a rectangular slot with a width varying mechanism to vary the width of the rectangular slot, a guide stop to control the length of the opening, and a position varying mechanism to adjust the position of the template on the side of the door.

U.S. Pat. No. 4,331,411 issued to Kessinger et al. ("Kessinger") discloses a lock drill assembly which may be removably affixed to a door at a specific location to mount a pair of angularly related drills, each of which is adapted to be driven into the door upon first and second axes at right angles.

U.S. Pat. No. 4,306,823 issued to Nashlund ("Nashlund") discloses a jig for guiding the bits of boring and routing tools to predetermined locations on a door in preparation for the installation of a door knob assembly. It includes an elongated channel-shaped frame to receive the edge of a door, a base portion and two side portions, and a pair of templates attached to the respective side portions to guide a boring tool bit to locations along the side of the door.

A need exists for templates for use in the installation of lock and alarm assemblies having multiple portions carried by separate portions of a door assembly that, upon assembly, must align and be maintained in precise positional relation to one another. In particular, there is a need for templates for use in the installation of lock and alarm assemblies that are simple, reversible, and capable of aligning alarm assemblies in both double door designs and in single door designs.

SUMMARY OF THE INVENTION

It is a general object of the present invention to provide a template for the installation of lock and alarm assemblies having multiple portions carried by separate portions of a door assembly that move relative to one another and which, upon assembly, must align. The present invention has the advantage of being reversibly handed. Another advantage of the present invention is that it provides a single template that may be used to align lock and alarm assemblies for use in either two doors or a door and a doorframe. Another advantage of the present invention is that it provides an inexpensive device that accurately aligns the relative portions of an alarm system.

These and other advantages of the present invention are achieved by providing a template comprising a central member that has a recess adapted to receive and position a first portion of an alarm assembly relative to the template. The central member has a first end and a second end. A longitudinal member extends perpendicular to, and coplanar with, the first end of the central member. The longitudinal member has at least one indicia for marking the installation location of the second portion of the alarm assembly on a second door. A flange extends from the second end of the central member in a plane perpendicular to that of the central member. The flange includes at least one indicia for marking the installation location of a second portion of the alarm assembly on a doorframe.

According to a preferred embodiment of the present invention, a locator extends from the recess for aligning engagement with a receiver on the first portion of the alarm assembly.

According to a preferred embodiment of the present invention, the indicia in the longitudinal member are a pair of apertures formed proximal the ends of the longitudinal member.

According to a preferred embodiment of the present invention, the indicia in the flange are a pair of notches formed proximal an upper end of the flange.

According to a preferred embodiment of the present invention, the first portion of the alarm assembly is an alarm sensor portion for mounting on the door and the second portion of the alarm assembly is a magnet for mounting on the doorframe.

According to a preferred embodiment of the present invention, the first portion of the alarm assembly is an alarm sensor portion for mounting on the door and the second portion of the alarm assembly is a magnet for mounting on an adjacent door.

According to a preferred embodiment of the present invention, the template is formed of polymeric material and the central, longitudinal, and flange portions are integrally formed.

Other objects, features and advantages of the present invention will become apparent with reference to the drawings and detailed description, which follow.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

Figure 1:
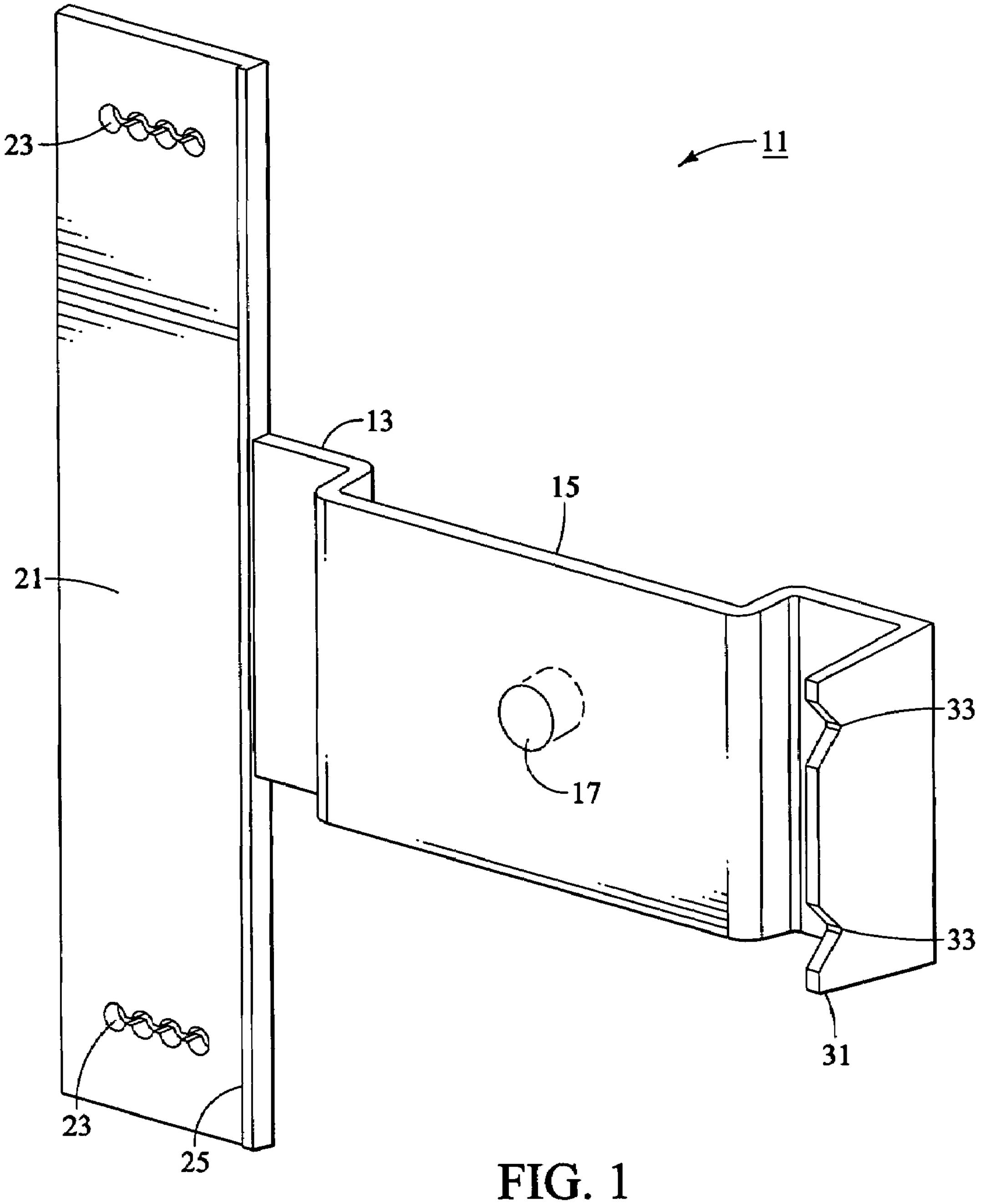
FIG. 1 is a perspective view of a template according to the preferred embodiment of the present invention.

Referring to FIG. 1, the reference numeral 11 generally designates a template according to a first preferred embodiment of the present invention. Template 11 comprises a traverse or central member 13. A recess 15 is formed in central member 13. A longitudinal member 21 extends from one end of central member 13. A flange 31 extends from the opposite end of central member 13.

Figure 3:
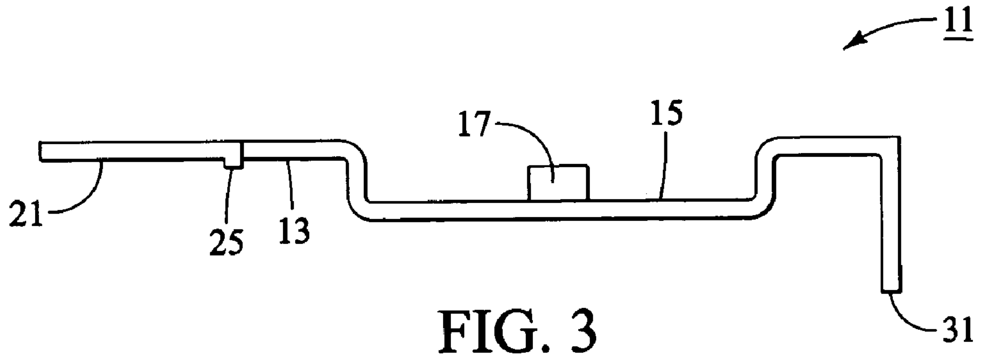
FIG. 3 is a top view of the template of FIGS. 1 and 3.

As best seen in FIG. 3, in the preferred embodiment, recess 15 is a generally parallel, offset section. A locator 17 extends from the recessed side of recess 15, of central member 13. In the preferred embodiment, locator 17 is cylindrical.

Figure 2:
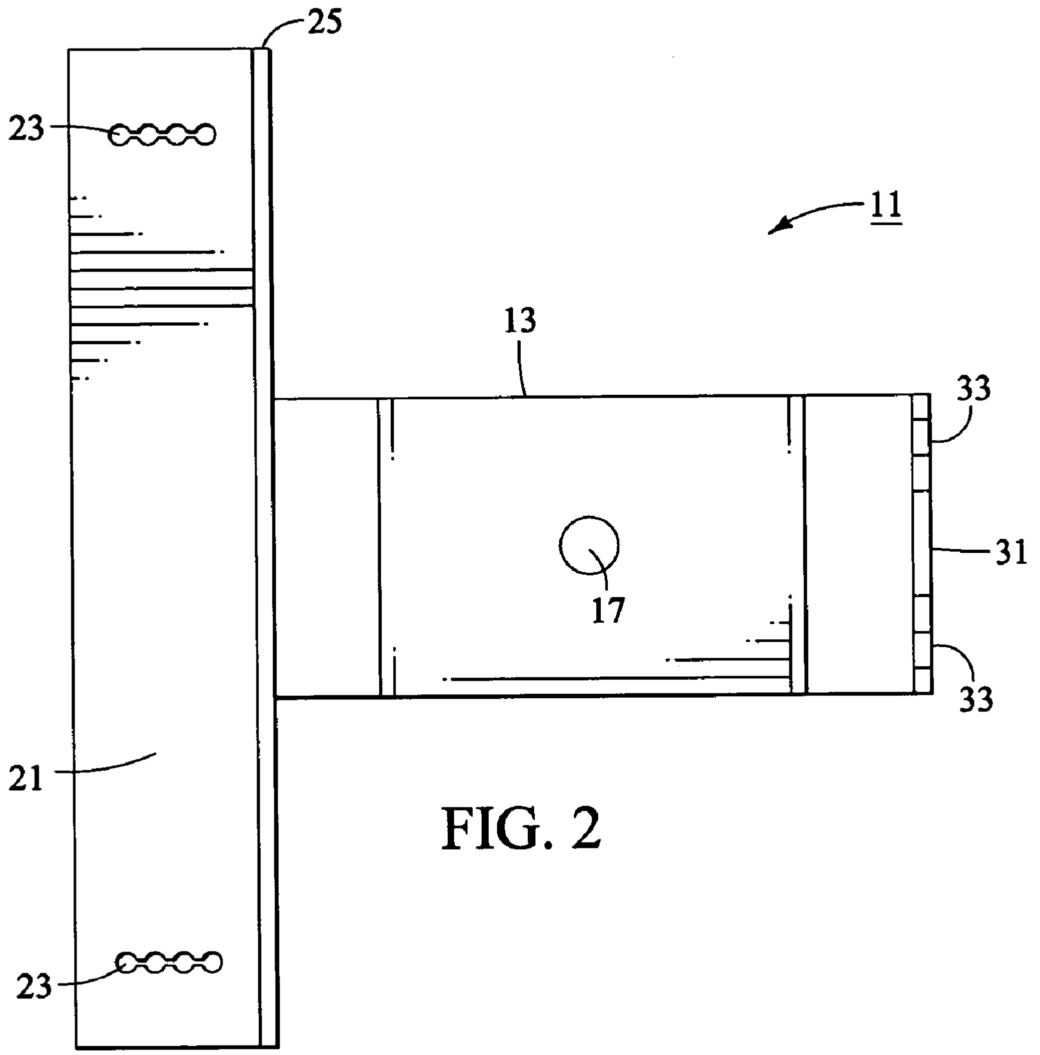
FIG. 2 is a front view of the template of FIG. 1.

Referring to FIGS. 1–3, longitudinal member 21 extends generally perpendicularly to, and generally co-planar with, central member 13. Longitudinal member 21 extends above and below central member 13. As best seen in FIG. 3, in the preferred embodiment, a ledge 25 is formed between central member 13 and longitudinal member 21. Ledge 25 preferably extends the length of longitudinal member 21. A series of indicia 23 are provided on each end of longitudinal member 21. In a preferred embodiment, indicia 23 are apertures 23. Apertures 23 are located beyond the width extents of central member 13.

Flange 31 extends from the other end of central member 13. As best seen in FIG. 3, flange 31 extends in a plane orthogonal to the plane of central member 13. As best seen in FIG. 1, one or more indicia 33 are formed on the end of flange 31. In a preferred embodiment, indicia 33 are a pair of notches 33.

Figure 4:
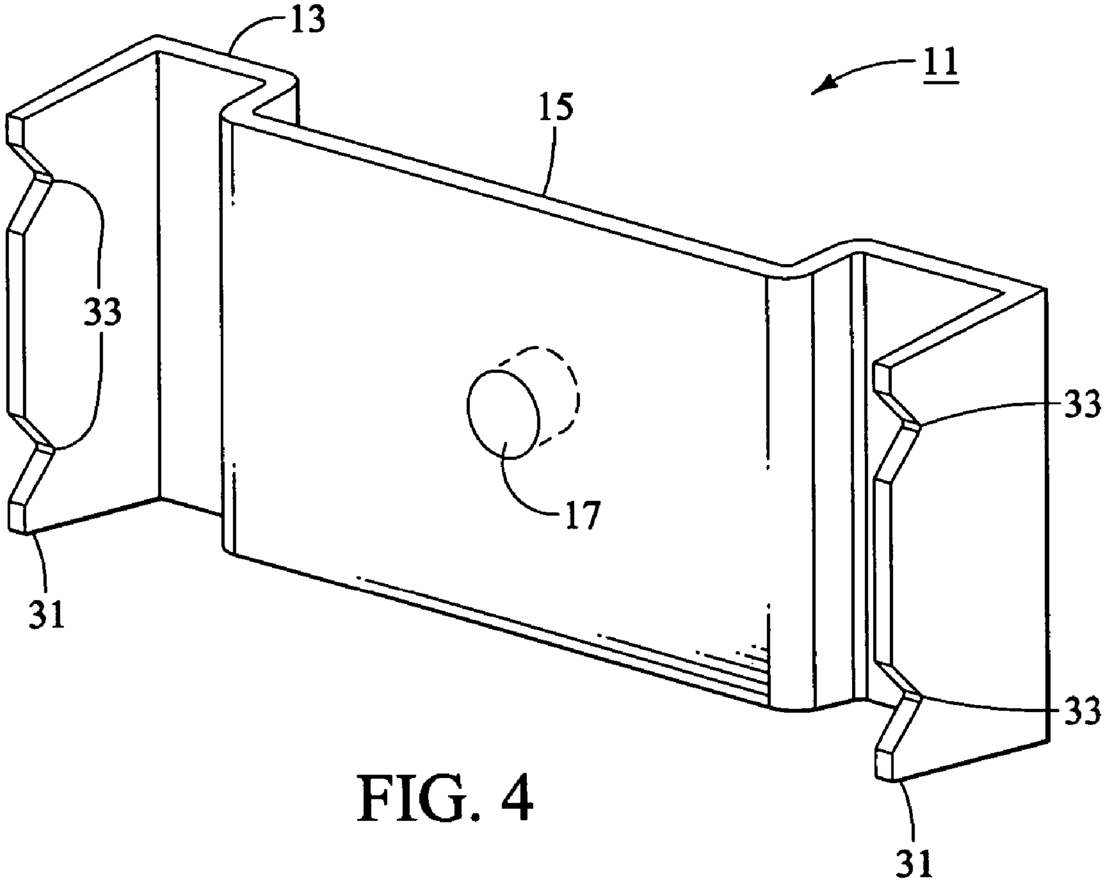
FIG. 4 is a perspective view of another preferred embodiment of the template of the present invention.

FIG. 4 discloses an alternative preferred embodiment of template 11 of the present invention. Template 11 again comprises a central member 13. In this embodiment, on each end of central member 13 there is a flange 31. Each flange 31 extends in a plane orthogonal to the plane of central member 13, and parallel to each other. Notches 33 are formed on the end of each flange 31.

According to the preferred embodiment of the present invention, template 11 is integrally formed of a polymeric or plastic material, such as by injection-molding. In a more preferred embodiment, the material is transparent.

OPERATION OF THE PREFERRED EMBODIMENTS

Referring now to the Figures, and particularly to FIGS. 1, 2, and 3, template 11 according to a preferred embodiment of the present invention is illustrated in perspective, front, and top views. As can be seen, template 11 comprises a central member 13.

Template 11 has utility with all lock and alarm system assemblies wherein two parts or portions must be secured to parts of a door assembly that move relative to one another. Template 11 may be used to align lock and alarm assemblies for use in either two doors or a door and a doorframe.

Figure 5:
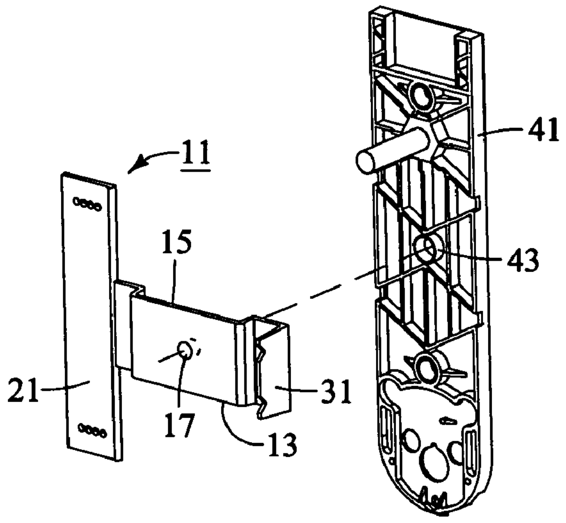
FIG. 5 is a perspective view of the use of a template disclosed in FIGS. 1, 2 and 3, illustrating the template and a first portion of an alarm assembly.
Figure 6:
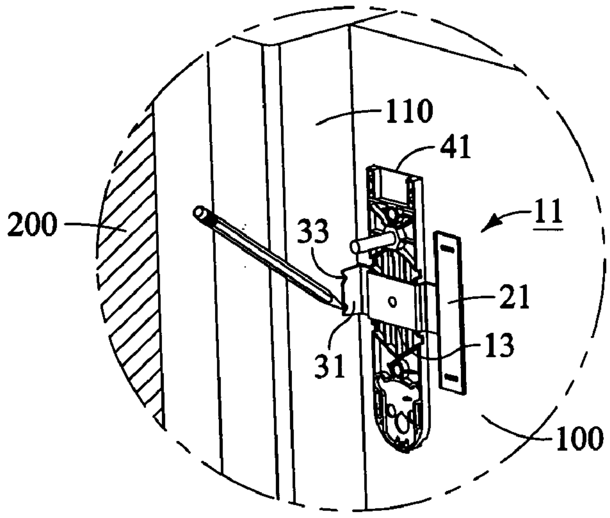
FIG. 6 is a perspective view of the use of a template disclosed in FIGS. 1, 2 and 3, illustrating the template engaging the first portion of an alarm assembly, as used to locate the position of a second portion of the alarm assembly on a door jamb.
Figure 7:
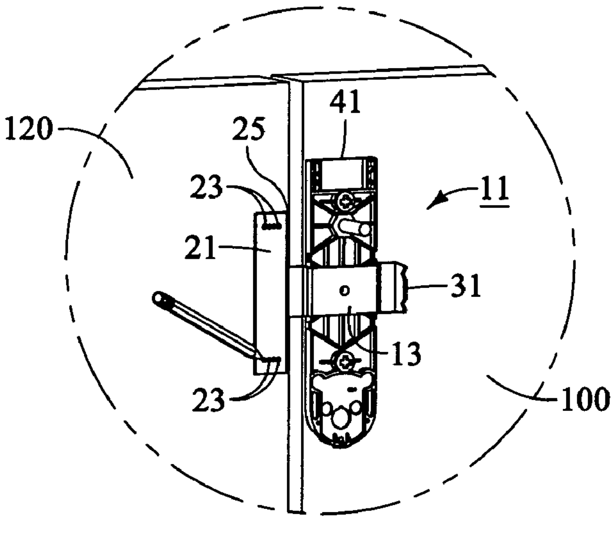
FIG. 7 is a perspective view of the use of a template disclosed in FIGS. 1, 3 and 4, illustrating the template engaging the alarm backing plate, as used to locate the position of a second alarm portion as between double doors.

FIGS. 5–7 illustrate the use of template 11 for alignment for installation of an alarm system comprising a first portion comprising a magnet sensor, and a second portion comprising a magnet. A locking mechanism may be provided to turn the alarm on and off (not shown). The system illustrated is for exemplary purposes only, and is not intended to limit the application of the invention to a specific alarm or lock construction.

Referring to FIGS. 5, 6, and 7, central member 13 is recessed at 15 to receive first portion 41 of an alarm assembly that is to be aligned and installed using template 11. Typically, first portion 41 comprises a backing or mounting plate for the magnet sensor of an alarm assembly. In the preferred embodiment, recess 15 is adapted for close complementary fit over first portion 41, thus registering a physical relationship between template 11 and first portion 41 in the horizontal plane.

In the preferred embodiment, first portion 41 includes an aperture 43. Also in this embodiment, central portion 13 of template 11 has a locator 17 in recess 15. Locator 17 is adapted for engagement with receiver 43, thus registering an additional physical relationship between template 11 and first portion 41 in the vertical plane. It will be understood by anyone of ordinary skill in the art that it is equivalent to place aperture 43 on recess 15 and locator 17 on first portion 41.

FIG. 6 illustrates use of template 11 to align and install an alarm assembly between a door 100 and a doorframe 110 affixed to a wall 200. When aligning and installing an alarm system between a door 100 and a doorframe 110, template 11 is oriented with flange 31 adjacent to doorframe 110.

Properly oriented, recess 15 in central member 13 is secured around first portion 41, and locator 17 is engaged with receiver 43. As can be seen in this view, with first portion 41 placed against door 100, template 11 and first portion 41 are in fixed relationship to each other relative to door 100.

Template 11 and first portion 41 are placed on door 100 in the desired location of first portion 41. Typically, a height from floor or ceiling will be measured prior to placing first portion 41 in the desired location.

Template 11 and first portion 41 are then located so that flange 31 is flush with doorframe 110. In this configuration, the perpendicularity of flange 31 to central portion 13 assures orthogonal alignment of first portion 41 with doorframe 110.

As shown in FIG. 6, notches 33 of flange 31 are used to mark the location for the second portion (magnet) of the alarm assembly, which is mounted in doorframe 110, using a pencil or scribe.

FIG. 7 illustrates use of template 11 to align and install an alarm assembly between a first door 100 and a second door 120. When aligning and installing an alarm system between two doors 100 and 120, template 11 is oriented with longitudinal portion 21 adjacent to the edge of door 120.

Properly oriented, recess 15 in central member 13 is secured around first portion 41, and locator 17 is engaged with receiver 43. As can be seen in this view, with first portion 41 placed against door 100, template 11 and first portion 41 are in fixed relationship to each other relative to door 100.

Template 11 and first portion 41 are placed on door 100 in the desired height location of first portion 41. Typically, a height from floor or ceiling will be measured prior to placing first portion 41 in the desired location.

Template 11 and first portion 41 are then located so that ridge 25 of longitudinal portion 21 is flush with the edge of door 120. In this configuration, the perpendicularity of longitudinal portion 21 to central portion 13 assures proper alignment of first portion 41 with door 120.

As shown in FIG. 7, apertures 23 of longitudinal portion 21 are used to mark the location for the second portion (magnet) of the alarm assembly, which is mounted to door 120, using a pencil or scribe.

The preferred embodiment of template 11 thus disclosed and described is useful in both "right-hand" and "left-hand" installations: it need only be rotated 180 degrees to accommodate either orientation of the lock assembly. It is also useful with both doorframe assemblies and door pair assemblies. It significantly reduces measuring and preparation time for installation of such assemblies and reduces the margin of error in such installations.

Referring back to FIG. 4, an alternative preferred embodiment is disclosed. Template 11 again comprises a central member 13. In this embodiment, on each end of central member 13, there is a flange 31 with notches 33 formed on the end of each flange 31. This embodiment is best suited for alarm assemblies to be installed only in doorframes. The advantage of this embodiment is that, in the proper application, it requires no orientation and is thus non-handed and very easy to use.

The material of which template 11 is made should be sufficiently rigid so that dimensional relationships between recess 15, locator 17, and indicia 23, 33 remain fixed so that the template can perform its function of fixing the installation locations of multiple parts of a lock or alarm assembly. In the preferred embodiment, template 11 is formed from injection-molded plastic. In a still more preferred embodiment, the material is transparent. Being integrally molded of relatively inexpensive polymer, the template according to the preferred embodiment of the present invention may be used once or many times at a reasonable, low cost.

The invention has been described with reference to a preferred embodiment thereof; it is thus not limited, but is susceptible to variation and modification without departing from the scope and spirit of the invention.

We claim:

1. A template for marking installation locations of a first portion of an alarm assembly relative to a second portion of the alarm assembly, and locating the portions of the alarm assembly relative to a door, the template comprising:

a central member having a recess adapted to receive and position the first portion relative to the template, the recess being dimensioned to receive the first portion of the alarm assembly; and, a flange extending from one end of the central member in a plane perpendicular to that of the central member, the flange including at least one indicium.

2. The template according to claim 1, further comprising:

a second flange extending from an end of the central member in a plane parallel to that of the flange, the second flange including at least one indicium.

3. The template according to claim 2, wherein the indicia on the flanges are notches.

4. The template according to claim 1, further comprising:

a longitudinal member extending from an end of the central member in perpendicular relation; and, indicia formed proximal to each end of the longitudinal member.

5. The template according to claim 3, wherein the indicia on the longitudinal member are a pair of apertures formed at proximal ends of the longitudinal member.

6. The template according to claim 1, further comprising:

a locator extending from the recess for engagement with a receiver on the first portion of the alarm assembly.

7. The template according to claim 1, further comprising:

a receiver located on the recess for engagement with a locator extending from the first portion of the alarm assembly.

8. The template according to claim 1, wherein the template is formed of injection molded plastic.

9. The template according to claim 1, wherein the template is made of a transparent material.

10. The template according to claim 1, wherein the template is formed of a generally rigid, laminar sheet of polymeric material.

11. The template according to claim 1, wherein the indicia on the flange is a notch formed proximal an upper end of the flange.

12. The template according to claim 1 further comprising:

the first portion is an alarm backing plate for mounting an alarm sensor portion of the alarm assembly to the door; and, the second portion of the alarm assembly is a magnet for mounting on the doorframe.

13. A template for marking installation locations of a first portion of an alarm assembly relative to a second portion of the alarm assembly, and locating the portions of the alarm assembly relative to a door, the template comprising:

a central member having a recess adapted to receive and position the first portion relative to the template, the recess being dimensioned to receive the first portion of the alarm assembly;

a locator extending from the recess for engagement with a receiver on the first portion of the alarm assembly;

a first flange extending from one end of the central member in a plane perpendicular to that of the central member, the flange including at least one indicium; and, a second flange extending from the opposite end of the central member in a plane parallel to that of the flange, the second flange including at least one indicium.

14. A template for marking installation locations of a first portion of an alarm assembly relative to a second portion of the alarm assembly, and locating the portions of the alarm assembly relative to a door, the template comprising:

a central member having a recess adapted to receive and position the first portion relative to the template, the recess being dimensioned to receive the first portion of the alarm assembly;

a locator extending from the recess for engagement with a receiver on the first portion of the alarm assembly;

a first flange extending from one end of the central member in a plane perpendicular to that of the central member, the flange including at least one indicium;

a longitudinal member extending from an end of the central member in perpendicular relation; and, indicia formed proximal to each end of the longitudinal member.

15. A template for marking installation locations of a first portion of an alarm assembly relative to a second portion of the alarm assembly, and locating the portions of the alarm assembly relative to a door, the template comprising:

a central member having a recess adapted to receive and position the first portion relative to the template, the recess being dimensioned to receive the first portion of the alarm assembly;

a locator extending from the recess for engagement with a receiver on the first portion of the alarm assembly;

a first flange extending from one end of the central member in a plane perpendicular to that of the central member, the flange including at least one indicium; and, a second flange extending from the opposite end of the central member in a plane parallel to that of the flange, the second flange including at least one indicium.

* * * * *